United States Patent [19]
Munos et al.

[11] Patent Number: 5,787,875
[45] Date of Patent: Aug. 4, 1998

[54] PROPANE BURNER SYSTEM FOR ORCHARDS

[75] Inventors: Jess K. Munos; Greg D. Paul; John R. Swyers; Thomas Sieverkropp, all of Hood River, Oreg.

[73] Assignee: Agheat, Inc., Hood River, Oreg.

[21] Appl. No.: 786,152

[22] Filed: Jan. 21, 1997

[51] Int. Cl.$^6$ ............................................. A01G 13/06
[52] U.S. Cl. ..................... 126/59.5; 431/355; 126/91 A; 126/85 R
[58] Field of Search ..................... 431/355; 126/59.5, 126/85 R, 91 R, 91 A

[56] References Cited

U.S. PATENT DOCUMENTS

| | | | |
|---|---|---|---|
| 1,232,457 | 7/1917 | Campbell | 126/85 R |
| 1,360,795 | 11/1920 | Regan | 126/85 R |
| 1,943,859 | 1/1934 | Fisher | 431/355 |
| 1,961,751 | 6/1934 | Feyling | 431/355 |
| 2,026,027 | 12/1935 | Evans | 431/355 |
| 2,118,741 | 5/1938 | Smith et al. | 431/355 |
| 3,002,512 | 10/1961 | Cowan | 126/91 R |
| 3,314,411 | 4/1967 | Powep | 126/85 R |
| 3,744,476 | 7/1973 | Georges | 126/59.5 |
| 5,239,979 | 8/1993 | Maurice et al. | 126/91 R |

OTHER PUBLICATIONS

"Instructions for Spud Heaters and Spud–Light Torch Assembly—Installation—Operation", SpudCo Inc., Yakima, Washington. Advertisement (at least as early as Jan. 1, 1997), 2 pages.

"Save Your Buds With . . . SPUDS!, Spud Orchard Heaters", SpudCo, Inc., Yakima, Washington. Advertisement (at least as early as Jan. 1, 1997), 1 page.

"Orchard Heater" general information sheet (at least as early as Jan. 1, 1997), 1 page.

*Primary Examiner*—Carroll B. Dority
*Attorney, Agent, or Firm*—Chernoff, Vilhauer, McClung & Stenzel, LLP

[57] ABSTRACT

A propane burner system for orchards includes a housing, a venturi system, and a propane fuel system. The housing preferably includes a bottom enclosure interconnected with a stack and may be a converted standard fuel burning orchard heater. The venturi system is positioned within the bottom enclosure so that it extends into the stack. The bottom enclosure has at least one vent/fuel opening and the stack preferably includes an igniter opening. The venturi system includes a support system, a flue that is preferably triangular in crosssection, an exhausting chamber, and a deflector plate.

18 Claims, 2 Drawing Sheets

5,787,875

PROPANE BURNER SYSTEM FOR ORCHARDS

BACKGROUND OF THE INVENTION

The present invention relates to a system for heating orchards using propane as a fuel as well as a method for converting existing oil heaters to the new system.

Since man began to plant and harvest food during the agricultural revolution he has been a slave to Mother Nature's weather whims. Cold and freezing weather, in particular, usually meant a ruined harvest. So man, ever the innovator, sought to control his environment by adding heat to prevent a crop from cold damage or frost damage.

Perhaps the first orchard heaters were simple open wood fires. These would not have been effective means of heating an entire orchard because of the massive amount of fuel needed and the possibility of burning the trees. Eventually modern orchard heaters were developed that used "standard fuel" such as oil, diesel, or kerosine. The standard fuel was stored in a bottom fuel tank in which a wick was positioned to soak up fuel. A stack was positioned so that it protruded upward out of the fuel tank. When the fuel soaked wick was lit, the stack served as a vacuum so that heat rose upward and out of the orchard heater to heat the orchard.

Use of standard fuel such as oil, diesel, and kerosine has several significant problems. It is a "dirty" form of fuel. For example, sulfur dioxide, a byproduct of the combustion of diesel fuel, when combined with fluids such as rainwater, produces acid rain. Further, the term "smudge-pot" is often used to describe the carbon, smut, and particulate matter produced by the combustion in this type of orchard heater. Also, these fuels are not particularly energy efficient. This is particularly true because it is difficult or impossible to control the amount of fuel burned. Still further, because the fuel is contained in a fuel tank at the bottom of the heater, if the heater is tipped or knocked over, the fuel easily spills. Fuel spills can be a fire hazard and can cause soil contamination, surface water contamination, and ground water contamination.

Recognizing these problems, attempts have been made to create an orchard heater fueled by propane, a cleaner, more energy efficient fuel that is stored in a separate, enclosed, tank that cannot be spilled. These propane orchard heaters have had limited success. Orchard owners have a significant investment in the standard orchard heaters. The orchard owners, therefore, have two alternatives: replace all their standard orchard heaters with new propane heaters or use some of both types of heaters. Because replacing all the standard heaters is prohibitively expensive, it is not an attractive option. Because using both types of heaters would require the orchard owners to keep two types of fuel on hand, it also is not an attractive option. So despite the advantages of propane orchard heaters, they have not been widely adopted.

BRIEF SUMMARY OF THE INVENTION

A propane burner system according to the present invention solves the problems of standard orchard heaters because it uses propane as a fuel. However, because the system may be retrofitted to existing standard orchard heaters, it is significantly less expensive than other propane heaters. It also allows an orchard owner to convert his existing standard orchard heaters so that he only has to keep one fuel on hand.

The propane burner system of the present invention generally includes a housing, a venturi system, and a propane fuel system. The housing preferably includes a bottom enclosure interconnected with a stack. The venturi system is positioned within the bottom enclosure so that it extends into the stack. The bottom enclosure has at least one vent/fuel opening and the stack preferably includes an igniter opening. The venturi system includes a support system, a flue that may be triangular in cross-section, an exhausting chamber, and a deflector plate.

The present invention may be created from a standard fuel burning orchard heater. To do this, at least one vent/fuel opening should be created in the bottom enclosure, the venturi system should be positioned within the bottom enclosure so that it extends into the stack, and propane fuel should be directed from a propane fuel source to the venturi system.

In use, air that enters from the vent/fuel openings mixes with the propane. The mixture flows upward through and compresses within the flue. The compressed mixture is ignited at the level of the exhausting chamber and is forced outward by the sides of the exhausting chamber and the deflector plate. The heat then flows out of the stack to warm the orchard, vineyard, or other crop.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
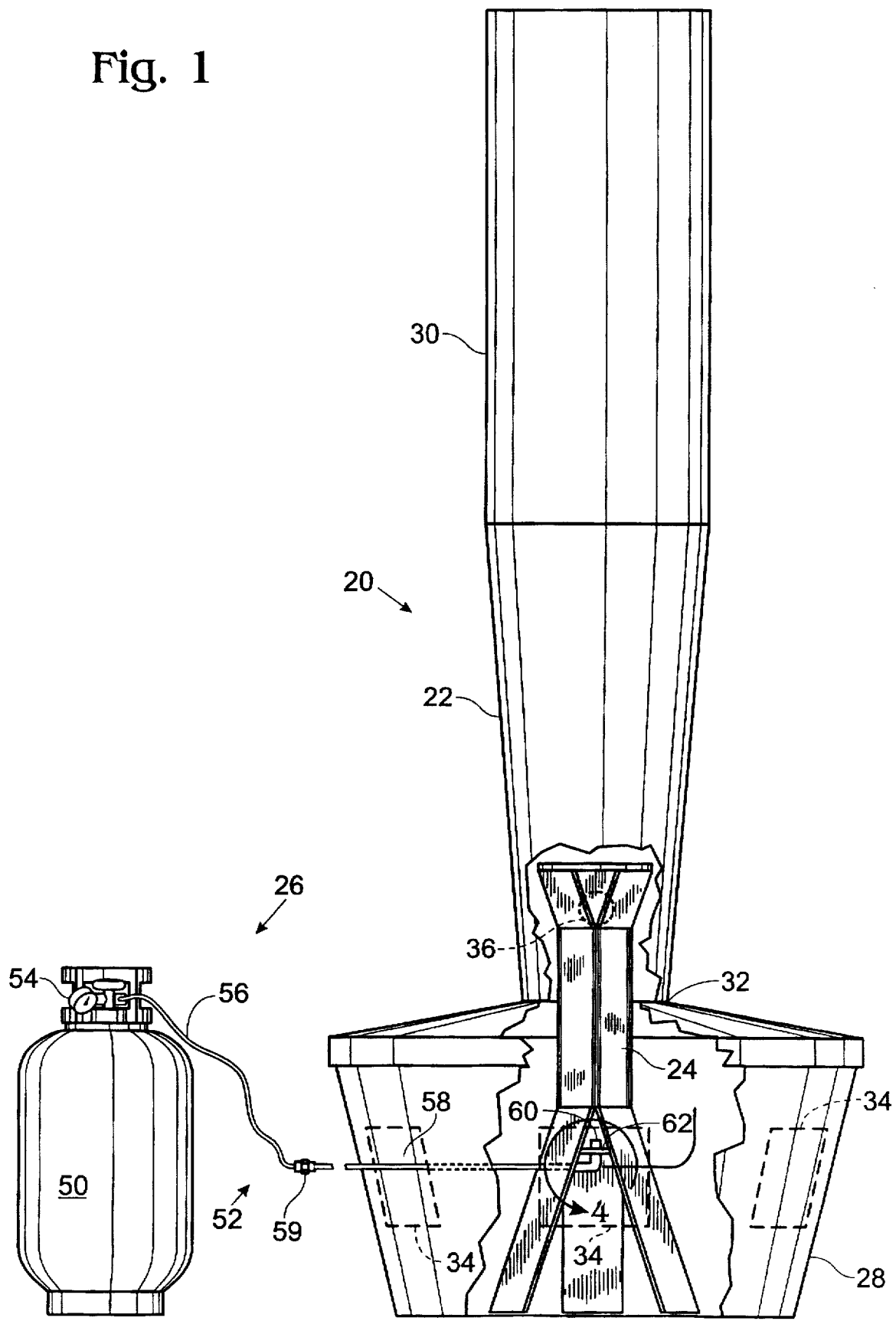
FIG. 1 is a side perspective view of a propane burner system of the present invention.

FIG. 1 is an exemplary embodiment of a propane burner system 20 of the present invention. Generally the system 20 includes a housing 22, a venturi system 24, and a propane fuel system 26.

Although the system 20 may be a produced and sold as a complete system, alternatively the system 20 may use a standard fuel burning orchard heater as the housing 22. In this way, the system 20 reuses existing standard fuel burning orchard heaters. Using either system, the housing 22 includes a bottom enclosure 28 and a stack 30. The bottom enclosure 28 has a stack opening 32 that may be a hole in a lid or the rim of the bottom enclosure 28. The stack 30 is fitted to the bottom enclosure 28 at the stack opening 32 so that the stack 30 forms a chimney to the bottom enclosure 28.

The bottom enclosure 28 also has at least one vent/fuel opening 34, that is shown as three vent/fuel openings 34, that allows air to enter the bottom enclosure 28 and may be used to provide access for the fuel system 26. The at least one vent/fuel opening 34 would have to be created in the bottom enclosure 28 of a standard fuel burning orchard heater.

The stack 30 preferably has an igniter opening 36 that allows a user to light the fuel/air mixture after it is combined in the venturi system 24. As with the at least one vent/fuel opening 34, the igniter opening 36 would have to be created in a stack 30 of a standard fuel burning orchard heater.

Figure 3:
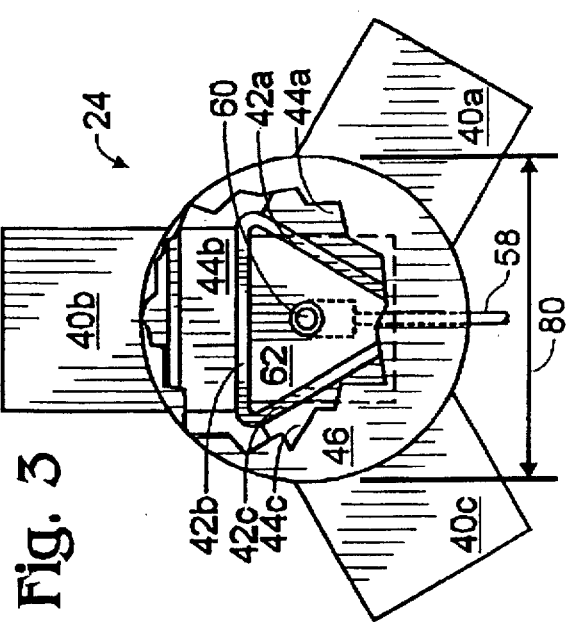
FIG. 3 is a top view of the venturi system.
Figure 2:
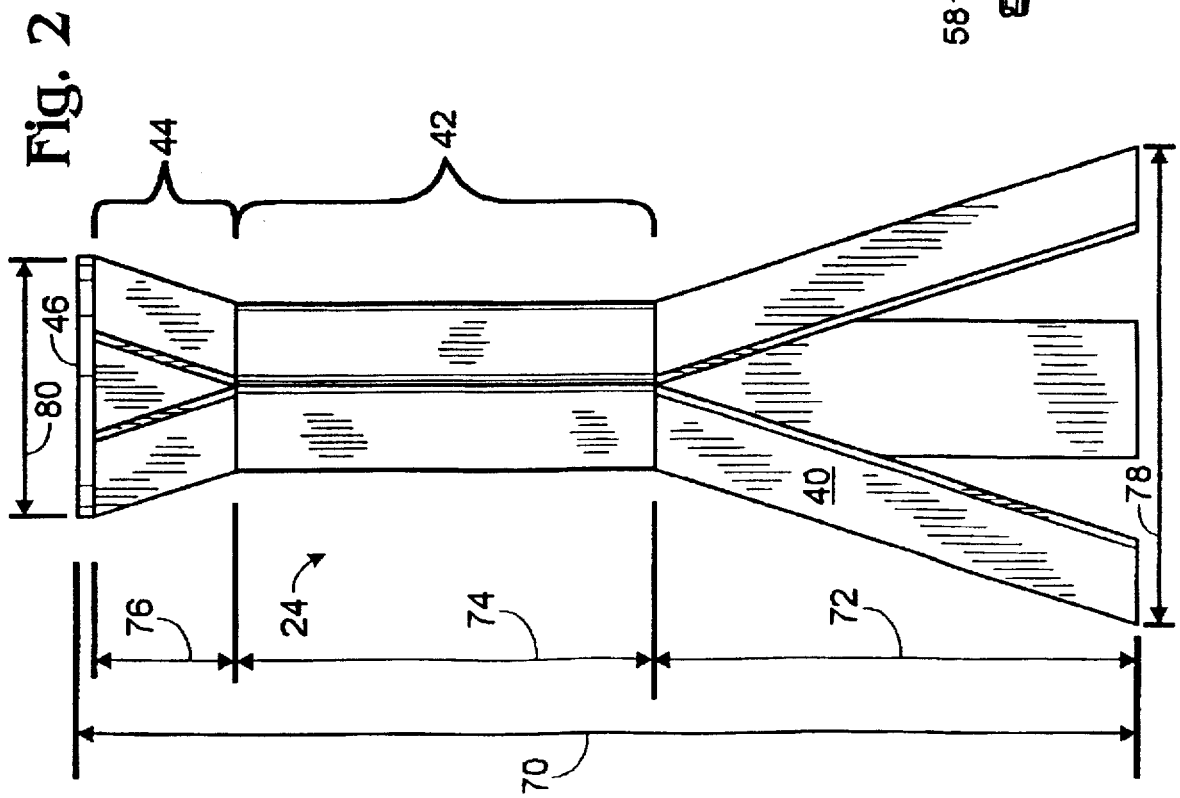
FIG. 2 is an enlarged side view of the venturi system.

The venturi system 24 is positionable within the bottom enclosure 28 and extends through the stack opening 32 into the stack 30. Accordingly, for venturi systems 24 that are used to retrofit standard fuel burning orchard heaters, the venturi system 24 is preferably taller than the bottom enclosure 28 and narrow enough to fit into the stack 30. FIGS. 2 and 3 show the venturi system 24 in more detail. As shown, the venturi system 24 includes a support system (shown as legs 40), a flue 42 attached to and supported by the legs 40, an exhausting chamber 44 attached to the flue 42, and a deflector plate 46 attached to the exhausting chamber 44. As shown in FIG. 3, the venturi system 24 has three sides, each of which forms a leg 40a–c, side of the flue 42a–c, and side of the exhausting chamber 44a–c. The three sides together make the cross-section of the flue 42 essentially triangular. The triangularly shaped flue 42 helps to create turbulence that helps the heat flow and combines the air and fuel.

The three flat legs 40 of the support system of the venturi system 24 may be replaced an alternate support system such as a single leg with a base or several wire legs. However, the flat, angled legs 40 are also useful in that they serve as a funnel that directs the propane/air mixture towards the bottom of the flue 42.

Figure 4:
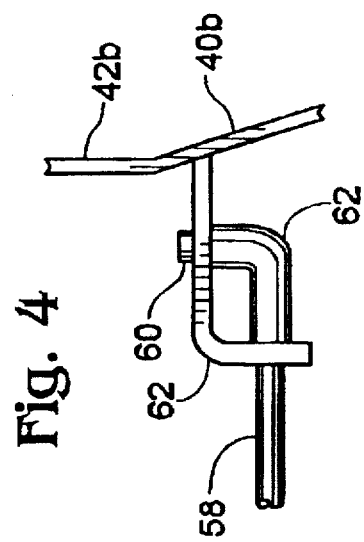
FIG. 4 is an enlarged-view of the fuel system in relation to the venturi system.

As shown in FIGS. 1 and 4, the propane fuel system 26 includes generally a propane fuel source 50 containing fuel and connection apparatus 52 for directing the fuel to the venturi system 24. The propane fuel source 50 may also include a regulator 54 that allows the flow of the propane to be controlled and adjusted by the user. FIG. 4 shows an exemplary connection apparatus 52 that includes a fuel supply hose 56, a fuel supply pipe 58 connected to the fuel supply hose 56 by a connector 59, a fuel nozzle 60, an elbow 61 between the fuel supply hose 56 and the fuel nozzle 60, and a mounting bracket 62 that holds the fuel supply connection apparatus 52 in place.

In the exemplary connection apparatus 52 in FIG. 4 the elbow 61 would be interconnectable with the fuel supply pipe 58 at one end and with the nozzle 60 at the other end. Using this configuration, the elbow 61 may be positioned against one side of the mounting bracket 62 and then the fuel supply pipe 58 and the nozzle 60 may be connected with their respective sides of the elbow 61 from the opposite side of the mounting bracket 62. The exemplary mounting bracket 62, as shown, could be welded or otherwise connected to a leg 40 of the support system.

The following exemplary dimensions of the system 20 produce heat movement in a downward direction from the heater to spread heat out and along the ground. The height 70 of the venturi system 24 as shown is approximately 17.5 inches. This is proportioned as follows: a leg height 72 of approximately 8.0 inches; a flue height 74 of approximately 7.0 inches; and a exhausting chamber height 76 of approximately 2.5 inches. The diameter 78 of the spread of the legs 40 is generally between 7.0 inches and 9.0 inches. The deflector plate diameter 80 is approximately 4.0 inches. Using these figures, the volume of the flue 42 would be approximately 19.0 cubic inches and the volume of the exhausting chamber 44 would be approximately 14.25 cubic inches. The volumes of the flue 42 and the exhausting chamber 44 have an approximately 1.33 ratio to each other. The nozzle 60 is positioned so that it is centered in the cross-section of the flue 42 (FIG. 3) and about one inch below the bottom of the flue 42. The above dimensions are meant to be exemplary and have been shown to be compatible with three major standard fuel burning orchard heaters. Standard mathematical formulas may be used to calculate alternate embodiments that may be used with other standard fuel burning orchard heaters or custom cases.

As mentioned above, the system 20 can be created using new parts or it can be refitted to a standard fuel burning orchard heater. Although many types of standard fuel burning orchard heaters exist, they generally have a bottom enclosure 28 and a stack 30. Some variations of standard fuel burning orchard heaters include those having a return stack, vents on the stack itself, or those that are pressure fed. These variations do not substantially effect the method of conversion. Additional parts such as the wick are preferably removed prior to the conversion as they are not needed in the propane orchard heater. It should be noted, however, that removal of the wick and other parts is an optional step.

One step of the conversion is to create at least one vent/fuel opening 34 in the bottom enclosure 28. This may be done by any method including puncturing, cutting, or burning out the vent/fuel openings 34. Another preferred, albeit optional step is to create the at least one igniter opening 36 in the stack 30. Once the housing 22 is set up, a venturi system 24 such as the one described above is positioned within the bottom enclosure 28 so that it extends through the stack opening 32 into the stack 20.

It should be noted that some stacks have louvers (not shown) at approximately the height of the exhausting chamber 44 of the venturi system 24. In these stacks heat can escape through the louvers. The advantage of the louvers, therefore, is that heat can escape near ground level. For stacks that do not have louvers, they may be added if desired.

Still another step is to direct fuel from a propane fuel source 50 to the venturi system 24. As shown in FIGS. 1 and 4, the exemplary connection apparatus 52 includes a fuel supply hose 56, a fuel supply pipe 58 connected to the fuel supply hose 56 by a connector 59, a fuel nozzle 60, an elbow 61 between the fuel supply hose 56 and the fuel nozzle 60, and a mounting bracket 62 that holds the fuel supply connection apparatus 52 in place. Using this system, the nozzle 60 is positioned so that it is centered in the cross-section of the flue 42 (FIG. 3) and about one inch below the bottom of the flue 42.

In use, air that enters from the vent/fuel openings 35 mixes with the propane that is emitted from the upwardly directed nozzle and the mixture flows upward through the flue 42. Within the flue 42 the mixture compresses. The compressed mixture, that is originally lit through the igniter opening 36 at the same level as the exhausting chamber 44, burns and is forced outward by the sides of the exhausting chamber 44a–c and the deflector plate 46. The heat then flows out of the stack 30 to warm the orchard, vineyard, or other crop. The heat flow would be essentially dictated by the type of stack 30 used.

The system 20 of the present invention, as mentioned above, may be retrofit into existing standard fuel burning orchard heaters. Some examples of the heaters for which this system 20 is compatible is a return stack heater and a pressure fed oil heater. The invention, however, is not limited to the conversion of these types of heaters.

Another feature of this invention is that one propane fuel source 50 may supply multiple systems 20 by adding additional connection apparatus 20 and adjusting the fuel pressure using the regulator 54.

Yet another feature of this invention is that, because it uses a clean fuel such as propane, it may be used indoors. Accordingly, it may be used to heat a green house or barn without the dirt and pollution caused by traditional "smudgepots."

The terms and expressions that have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims that follow.

We claim:

1. A propane burner system for orchards, said system comprising:
    (a) a housing comprising:
        (i) a bottom enclosure defining a stack opening and at least one vent/fuel opening; and
        (ii) a stack fitted to said bottom enclosure at said stack opening;
    (b) a venturi system positionable within said bottom enclosure and extending through said stack opening into said stack; and
    (c) a propane fuel system insertable through said at least one vent/fuel opening.

2. The system of claim 1 wherein said at least one vent/fuel opening is three vent/fuel openings.

3. The system of claim 1, said stack defining an igniter opening.

4. The system of claim 1, said venturi system comprising:
    (a) a support system;
    (b) a flue attached to and supported by said support system;
    (c) an exhausting chamber attached to said flue; and
    (d) a deflector plate attached to said exhausting chamber.

5. The system of claim 4 wherein said support system is a plurality of legs.

6. The system of claim 4 wherein said flue is triangular in cross-section.

7. The system of claim 1, said propane fuel system comprising:
    (a) a propane fuel source containing fuel; and
    (b) connection apparatus for directing said fuel to said venturi system.

8. The system of claim 7, said propane fuel source further comprising a regulator.

9. The system of claim 7, said connection apparatus further comprising a fuel nozzle.

10. The system of claim 7, said connection apparatus further comprising a mounting bracket for correctly positioning said connection apparatus in relation to said venturi system.

11. A method for converting a standard fuel burning orchard heater having a bottom enclosure and a stack to a propane orchard heater, said standard fuel burning orchard heater having a bottom enclosure with a stack opening and a stack fitted to said bottom enclosure at said stack opening, said method comprising the steps of:
    (a) creating at least one vent/fuel opening in said bottom enclosure;
    (b) positioning a venturi system within said bottom enclosure and extending through said stack opening into said stack; and
    (c) directing propane fuel from a propane fuel source to said venturi system.

12. The method of claim 11 further comprising the step of creating at least one igniter opening in said stack.

13. The method of claim 11 wherein said standard fuel burning orchard heater has a wick, said method further comprising the step of removing said wick.

14. A venturi system for combining propane from a propane fuel system and air in a venturi action, said system comprising:
    (a) a support system;
    (b) a flue attached to and supported by said support system, said flue being triangular in cross-section;
    (c) an exhausting chamber attached to said flue; and
    (d) a deflector plate attached to said exhausting chamber.

15. The system of claim 14 wherein said support system is a plurality of legs.

16. A propane burner system for orchards, said system comprising:
    (a) a housing comprising:
        (i) a bottom enclosure defining a stack opening and at least one vent/fuel opening; and
        (ii) a stack fitted to said bottom enclosure at said stack opening;
    (b) a venturi system positionable within said bottom enclosure and extending through said stack opening into said stack, said venturi system comprising;
        (i) a support system;
        (ii) a flue attached to and supported by said support system;
        (iii) an exhausting chamber attached to said flue; and
        (iv) a deflector plate attached to said exhausting chamber; and
    (c) a propane fuel system insertable through said at least one vent/fuel opening.

17. The system of claim 16 wherein said support system is a plurality of legs.

18. The system of claim 16 wherein said flue is triangular in cross-section.

* * * * *

UNITED STATES PATENT AND TRADEMARK OFFICE
CERTIFICATE OF CORRECTION

PATENT NO. : 5,787,875
DATED : August 4, 1998
INVENTOR(S) : Munos et al.

It is certified that error appears in the above-identified patent and that said Letters Patent is hereby corrected as shown below:

Col. 2, line 7: delete "may'be" and insert --may be--.

Signed and Sealed this

Seventeenth Day of August, 1999

Attest:

Q. TODD DICKINSON

Attesting Officer

Acting Commissioner of Patents and Trademarks